United States Patent
Mongeau

(10) Patent No.: US 9,518,562 B2
(45) Date of Patent: Dec. 13, 2016

(54) WIND TURBINE GENERATOR HAVING AN EDDY CURRENT BRAKE, WIND TURBINE HAVING SUCH A GENERATOR, AND ASSOCIATED METHODS

(71) Applicant: Vestas Wind Systems A/S, Aarhus N. (DK)

(72) Inventor: Peter Mongeau, Center Conway, NH (US)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/438,428

(22) PCT Filed: Sep. 12, 2013

(86) PCT No.: PCT/DK2013/050295
§ 371 (c)(1),
(2) Date: Apr. 24, 2015

(87) PCT Pub. No.: WO2014/063708
PCT Pub. Date: May 1, 2014

(65) Prior Publication Data
US 2016/0047359 A1    Feb. 18, 2016

Related U.S. Application Data

(63) Continuation of application No. 13/659,464, filed on Oct. 24, 2012, now abandoned.

(51) Int. Cl.
*F03D 9/00* (2016.01)
*F03D 7/02* (2006.01)
(Continued)

(52) U.S. Cl.
CPC .............. *F03D 9/002* (2013.01); *F03D 7/0244* (2013.01); *F03D 80/80* (2016.05); *H02K 7/104* (2013.01);
(Continued)

(58) Field of Classification Search
CPC ...... Y02E 10/723; Y02E 10/725; Y02E 10/72; Y02E 10/74; H02P 2009/004; H02K 9/06; H02K 5/20; H02K 9/19
(Continued)

(56) References Cited

U.S. PATENT DOCUMENTS 2,017,665 A * 10/1935 Logan, Jr. ................. B60L 7/28
188/10
2,017,666 A * 10/1935 Baughman ................ B60L 7/28
188/10
(Continued)

FOREIGN PATENT DOCUMENTS

EP        486765 A1    5/1992

OTHER PUBLICATIONS

International Searching Authority, International Search Report issued in corresponding Application No. PCT/DK2013/050295 dated Nov. 26, 2014, 11 pages.
(Continued)

*Primary Examiner* — Tulsidas C Patel
*Assistant Examiner* — Charles Reid, Jr.
(74) *Attorney, Agent, or Firm* — Wood, Herron & Evans LLP

(57) ABSTRACT

A wind turbine generator includes an outer housing, a drive shaft rotatably mounted within the outer housing, stator and rotor assemblies positioned within the outer housing and movable relative to each other, a heat exchanger, and a blower having a rotating plate for generating a fluid flow circuit within the generator for transporting heat from the
(Continued)

stator and rotor assemblies to the heat exchanger. An eddy current brake having a rotating member is located within the outer housing and is positioned in the fluid flow circuit such that fluid moving in the flow circuit cools the first rotating member. The blower and the eddy current brake may be integrated, such as by having the rotating plate of the blower serve as the rotating member of the eddy current brake. A wind turbine having such a generator, as well as a method of operating a wind turbine generator is also disclosed.

21 Claims, 11 Drawing Sheets

(51) Int. Cl.
  *H02K 7/18* (2006.01)
  *H02K 7/104* (2006.01)
  *H02K 9/08* (2006.01)
  *H02K 9/19* (2006.01)
  *F03D 80/80* (2016.01)
  *H02K 9/06* (2006.01)

(52) U.S. Cl.
  CPC .............. *H02K 7/1838* (2013.01); *H02K 9/08* (2013.01); *H02K 9/19* (2013.01); *F05B 2260/20* (2013.01); *F05B 2260/903* (2013.01); *H02K 9/06* (2013.01); *Y02E 10/722* (2013.01); *Y02E 10/723* (2013.01); *Y02E 10/725* (2013.01)

(58) Field of Classification Search
  USPC ................. 290/55, 44; 310/58, 62, 63, 105
  See application file for complete search history.

(56) References Cited

U.S. PATENT DOCUMENTS

| | | | | |
|---|---|---|---|---|
| 2,058,024 | A * | 10/1936 | Logan, Jr. | H02K 49/043 310/93 |
| 2,493,607 | A * | 1/1950 | Wendelburg | B66C 13/26 310/93 |
| 2,920,220 | A * | 1/1960 | Diesfeld | F16D 65/78 310/61 |
| 3,522,461 | A * | 8/1970 | Geul | H02K 49/046 310/93 |
| 4,198,572 | A * | 4/1980 | Kant | F03D 7/0244 290/44 |
| 4,486,638 | A | 12/1984 | de Bennetot | |
| 4,776,171 | A * | 10/1988 | Perry, Jr. | C02F 1/047 518/702 |
| 4,853,573 | A | 8/1989 | Wolcott et al. | |
| 5,447,412 | A * | 9/1995 | Lamont | F03D 3/0463 415/2.1 |
| 7,843,080 | B2 * | 11/2010 | Jansen | F03D 9/002 290/44 |
| 2006/0071575 | A1* | 4/2006 | Jansen | B63H 21/17 310/266 |
| 2007/0187954 | A1 | 8/2007 | Struve et al. | |
| 2007/0222223 | A1* | 9/2007 | Bagepalli | F03D 9/002 290/55 |
| 2007/0257492 | A1* | 11/2007 | Robson | F03B 13/264 290/54 |
| 2009/0162202 | A1* | 6/2009 | Nies | F03D 1/003 416/147 |
| 2010/0009799 | A1* | 1/2010 | Ciszak | F03D 11/0008 475/159 |
| 2010/0079016 | A1* | 4/2010 | Hemmelmann | F03D 9/002 310/54 |
| 2010/0140952 | A1* | 6/2010 | Jansen | F03D 9/002 290/55 |
| 2010/0176674 | A1* | 7/2010 | Post | H02K 49/102 310/103 |
| 2011/0002772 | A1* | 1/2011 | Colling | F03D 7/0252 415/1 |
| 2011/0304149 | A1* | 12/2011 | Pasteuning | F03D 11/00 290/55 |
| 2012/0038157 | A1 | 2/2012 | Skala | |
| 2012/0181792 | A1* | 7/2012 | Pettersen | F03D 9/002 290/55 |
| 2013/0092681 | A1* | 4/2013 | Nangle | H05B 6/108 219/630 |

OTHER PUBLICATIONS

U.S. Patent and Trademark Office, Office Action issued in corresponding U.S. Appl. No. 13/659,464, dated Jul. 24, 2014, 17 pages.
U.S. Patent and Trademark Office, Office Action issued in corresponding U.S. Appl. No. 13/659,464, dated Feb. 5, 2014, 17 pages.

* cited by examiner

WIND TURBINE GENERATOR HAVING AN EDDY CURRENT BRAKE, WIND TURBINE HAVING SUCH A GENERATOR, AND ASSOCIATED METHODS

TECHNICAL FIELD

The invention relates generally to wind turbines, and more particularly, to a wind turbine generator having an eddy current brake positioned within the generator, a wind turbine having such a wind turbine generator, and methods for operating a wind turbine having an eddy current brake within the generator of the wind turbine.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled with a generator for converting the kinetic energy of the blades to electrical energy.

Wind turbines are massive machines having relatively large masses moving at relatively high rates of speed. For example, the rotor of a modern wind turbine may weigh in the range of 25-50 tons and have blade tip speeds around 300 ft/s. Additionally, generator components, such as the rotor assembly which typically carries heavy magnets or the like, have considerable weight and are subject to relatively high rotational speeds. Thus, it may be important to incorporate within a wind turbine measures or systems configured to control these components, and more specifically, for reducing the rotational speed of these components under certain conditions.

Conventional wind turbine designs may provide a number of ways to reduce the speed of the rotor and generator of the wind turbine. For example, many modern wind turbines include blade pitch mechanisms that allow the blades to rotate about their longitudinal axis to affect the aerodynamic forces acting on the blades. The pitch mechanisms may be used to pitch the blades, for example, out of the wind so as to slow the wind turbine rotor and generator. Thus, for example, when wind conditions become high or excessive, the blades may be pitched in order to reduce the lift forces acting on the blades, and thus reduce the speed of the rotor and the generator operatively coupled thereto. In a further example, in a grid fault, the electrical load on the generator drops suddenly, thereby causing the generator speed and rotor speed to suddenly increase. In these over-speed conditions, the blades may again be pitched in a manner that reduces the rotor and generator speeds.

In addition to pitch mechanisms, wind turbines may also include other braking mechanisms configured to reduce the speed of the rotor or prevent the rotor from turning. In this regard, wind turbines may include mechanical braking systems that rely on friction between two surfaces (e.g., rotor disc and pads) to reduce or restrict the rotation of the rotor. For example, various drum and disc brake systems have been used in various wind turbine arrangements to reduce the speed of the rotor and/or to secure the rotor in a parked position.

These braking systems, however, are not without their drawbacks. In this regard, pitch-based rotor braking may impose stresses in other wind turbine components, such as the wind turbine tower or foundation, for example. Additionally, friction-based rotor brakes require regular maintenance and replacement parts, including disc and pad replacement that are subject to wear and damage. Moreover, friction-based rotor brakes are primarily effective once the rotational speed of the wind turbine rotor has already been significantly reduced. Thus, these types of brakes may not be particularly useful under certain high speed conditions where it is desired to reduce the speed of the rotor.

Accordingly, there is a need for a braking system that addresses these and other shortcomings of existing wind turbine braking systems. More particularly, there is a need for a braking system that reduces or eliminates the need for regular maintenance and replacement parts, can be used over a relatively large range of rotor speeds, and minimizes the impact of a braking procedure on other or adjacent wind turbine components.

SUMMARY

According to one embodiment, a wind turbine generator includes an outer housing, a drive shaft rotatably mounted within the outer housing, a stator assembly positioned within the outer housing, and a rotor assembly positioned within the outer housing, wherein the stator assembly is coupled to the outer housing so as to be stationary and the rotor assembly is operatively coupled to the drive shaft so as to be rotated with rotation of the drive shaft. The generator may further include a heat exchanger for removing heat from the generator, and a blower positioned within the outer housing for generating a first fluid flow circuit within the generator configured to transport heat from at least one of the stator and rotor assemblies to the heat exchanger. The blower includes a first rotating plate. In accordance with an embodiment of the invention, a first eddy current brake is positioned within the outer housing and includes a first rotating member. The first rotating member of the first eddy current brake is positioned in the first fluid flow circuit established by the blower such that fluid moving in the first fluid flow circuit passes over the first rotating member so as to cool the first rotating member.

In an exemplary embodiment, the first eddy current brake is integrated with the blower. More specifically, the first rotating plate of the blower operates as the first rotating member of the first eddy current brake. The first eddy current brake may include a first magnet assembly including a plurality of electromagnetic modules positioned in close proximity to the first rotating member, wherein the generator further includes a controller for controlling the current to the electromagnetic modules so as to control the braking provided by the first eddy current brake.

The generator may include a second eddy current brake positioned within the outer housing and including a second rotating member, wherein the second rotating member is positioned in the first fluid flow circuit established by the blower such that fluid moving in the first fluid flow circuit passes over the second rotating member so as to cool the second rotating member. In an exemplary embodiment, the second eddy current brake is integrated with a blower. For example, the second eddy current brake may be integrated with the same blower that is integrated with the first eddy current brake. The blower may include a second rotating plate, wherein the second rotating plate of the blower may operate as the second rotating member of the second eddy current brake. The second eddy current brake may include a second magnet assembly including a plurality of electromagnetic modules positioned in close proximity to the second rotating member, wherein the generator may include a controller for controlling the current to the electromagnetic modules so as to control the braking provided by the second eddy current brake.

The generator may include a second fluid flow circuit flowing through the heat exchanger configured to remove heat from the first fluid flow circuit and transfer the heat away from the generator. In this regard, the heat exchanger may include a plurality of conduits extending therethrough configured to carry the fluid from the first fluid flow conduit and maintain the fluid of the first fluid flow circuit isolated from the fluid of the second fluid flow circuit. In an exemplary embodiment, the heat exchanger may include a water jacket. Moreover, the rotor assembly rotating with the drive shaft may include a plurality of passageways extending along a length thereof configured to carry the fluid from the first fluid flow circuit.

In one embodiment, a wind turbine includes a tower, a nacelle disposed adjacent a top of the tower, a rotor including a hub and at least one wind turbine blade extending from the hub, and a generator disposed in the nacelle. The generator includes an outer housing, a drive shaft rotatably mounted within the outer housing, a stator assembly positioned within the outer housing, and a rotor assembly positioned within the outer housing, wherein the stator assembly is coupled to the outer housing so as to be stationary and the rotor assembly is operatively coupled to the drive shaft so as to be rotated with rotation of the drive shaft. The generator may further include a heat exchanger for removing heat from the generator, and a blower positioned within the outer housing for generating a first fluid flow circuit within the generator configured to transport heat from at least one of the stator and rotor assemblies to the heat exchanger. The blower includes a first rotating plate. A first eddy current brake is positioned within the outer housing and includes a first rotating member. The first rotating member of the first eddy current brake is positioned in the first fluid flow circuit established by the blower such that fluid moving in the first fluid flow circuit passes over the first rotating member so as to cool the first rotating member.

In a further embodiment, a method of operating a wind turbine generator having an outer housing, a drive shaft rotatably mounted within the outer housing, a stator assembly positioned within the outer housing, a rotor assembly positioned within the outer housing, and a heat exchanger includes driving the drive shaft of the generator using a rotor of a wind turbine; rotating the rotor assembly relative to the stator assembly to generate electricity; establishing within the outer housing a first fluid flow circuit configured to transport heat to the heat exchanger, the first fluid flow circuit being established by a blower having a first rotating plate; positioning a first eddy current brake within the outer housing such that a first rotating member of the first eddy current brake is positioned in the first fluid flow circuit; using the first eddy current brake to apply a braking force; and cooling the first rotating member by passing fluid moving in the first fluid flow circuit over the first rotating member.

The method may further include integrating the first eddy current brake into the blower. More particularly, the method may include using the first rotating plate of the blower as the rotating member of the first eddy current brake. Still further, the method may include providing a second eddy current brake positioned in the outer housing and having a second rotating member; positioning the second rotating member in the first fluid flow circuit; and cooling the second rotating member by passing fluid moving in the first fluid flow circuit over the second rotating member. The second eddy current brake may be integrated into a blower. The method may further include using a second fluid flow circuit to remove heat from the first fluid flow circuit and away from the generator.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION

Figure 1:
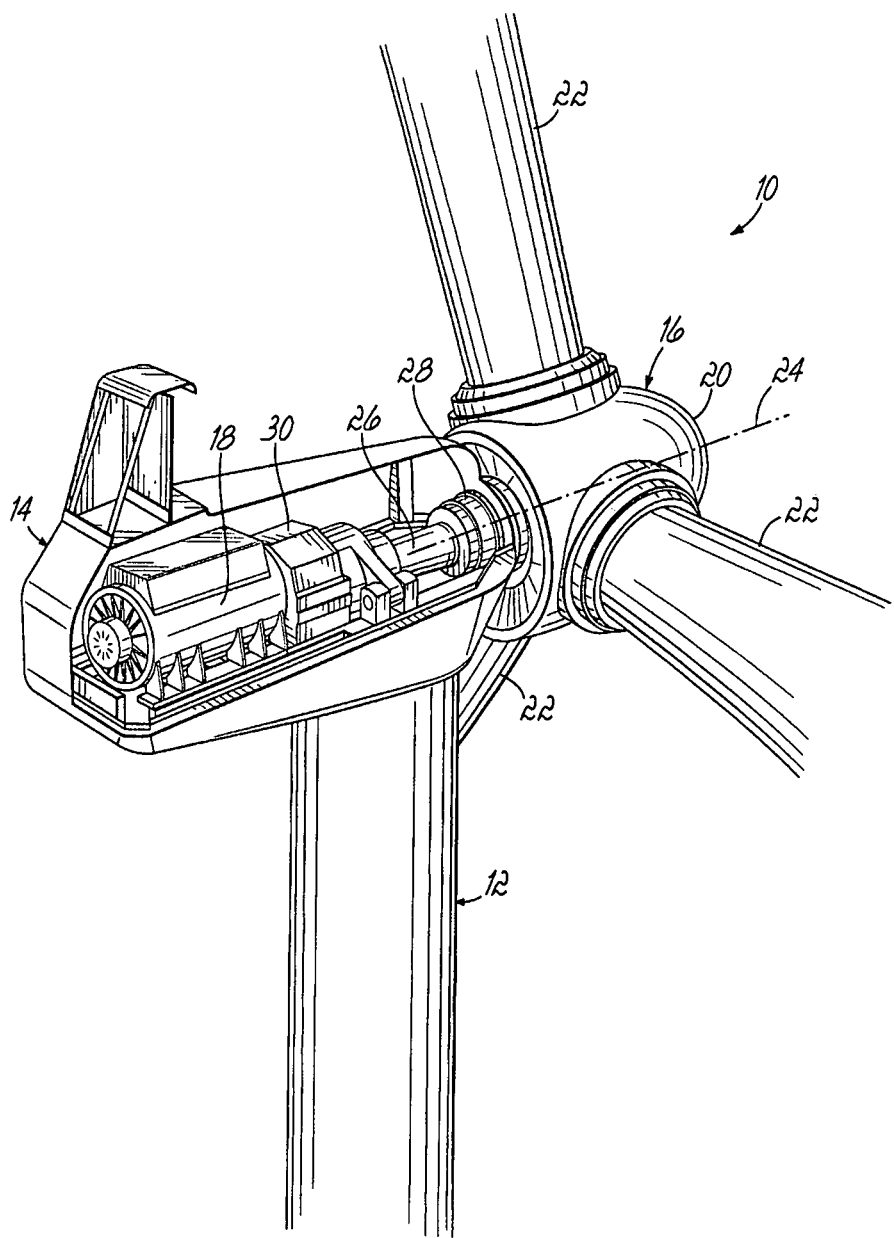
FIG. 1 is a partially torn away perspective view of a wind turbine having a generator in accordance with an embodiment of the invention.

With reference to FIG. 1 and in accordance with an embodiment of the invention, a wind turbine 10 includes a tower 12, a nacelle 14 disposed at the apex of the tower 12, and a rotor 16 operatively coupled to a generator 18 housed inside the nacelle 14. In addition to the generator 18, the nacelle 14 houses miscellaneous components required for converting wind energy into electrical energy and various components needed to operate, control, and optimize the performance of the wind turbine 10. The tower 12 supports the load presented by the nacelle 14, the rotor 16, the generator 18 and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a direction substantially perpendicular to the wind direction. The rotor 16 of wind turbine 10 includes a central hub 20 and at least one blade 22 that projects outwardly from the central hub 20. In the representative embodiment, the rotor 16 includes three blades 22 at locations circumferentially distributed thereabout, but the number may vary. The blades 22 are configured to interact with the passing air flow to produce lift that causes the central hub 20 to spin about a longitudinal axis 24. The design and construction of the blades 22 are familiar to a person having ordinary skill in the art and will not be further described. For example, each of the blades 22 may be connected to the central hub 20 through a pitch mechanism (not shown) that allows the blades to pitch under control of a pitch controller.

The rotor 16 may be mounted on an end of a main drive shaft 26 that extends into the nacelle 14 and is rotatably supported therein by a main bearing assembly 28 coupled to the framework of the nacelle 14. The main drive shaft 26 is operatively coupled to one or more gear stages, which may be in the form of a gear box 30, to produce a more suitable mechanical input to the generator 18 located in the nacelle 14. The gear box 30 relies on various gear arrangements to provide speed and torque conversions from the rotation of the rotor and main drive shaft 26 to the rotation of a secondary drive shaft 32 (FIG. 2) that operates as an input to the generator 18. By way of example, the gear box 30 may transform the relatively low rotational speed of the main drive shaft 26 (e.g., 5 to 25 revolutions per minute (rpm)) to a relatively high rotational speed (e.g., 3,000 rpm or higher) of the secondary drive shaft 32 which is mechanically coupled to the generator 18. Although the wind turbine 10 has been described as an indirect drive system, it should be realized that the wind turbine may also be configured as a direct drive system and remain within the scope of the invention.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

In accordance with an aspect of the invention, a brake assembly, and more specifically an eddy current brake, may be incorporated into the generator of the wind turbine. As will be discussed in more detail below, incorporating the eddy current brake into the generator may provide certain benefits not currently available. More particularly, locating the eddy current brake within the generator may improve cooling of the brake, and thus provide improved or enhanced braking capabilities for the wind turbine. Furthermore, locating the eddy current brake within the generator may allow generator designers and manufacturers to combine certain functions or components so as to reduce the number of components, assembly time, and overall costs. To this end and as discussed below, the eddy current brake may be integrated with a blower used to cool the heat-producing components of the generator.

Figure 2:
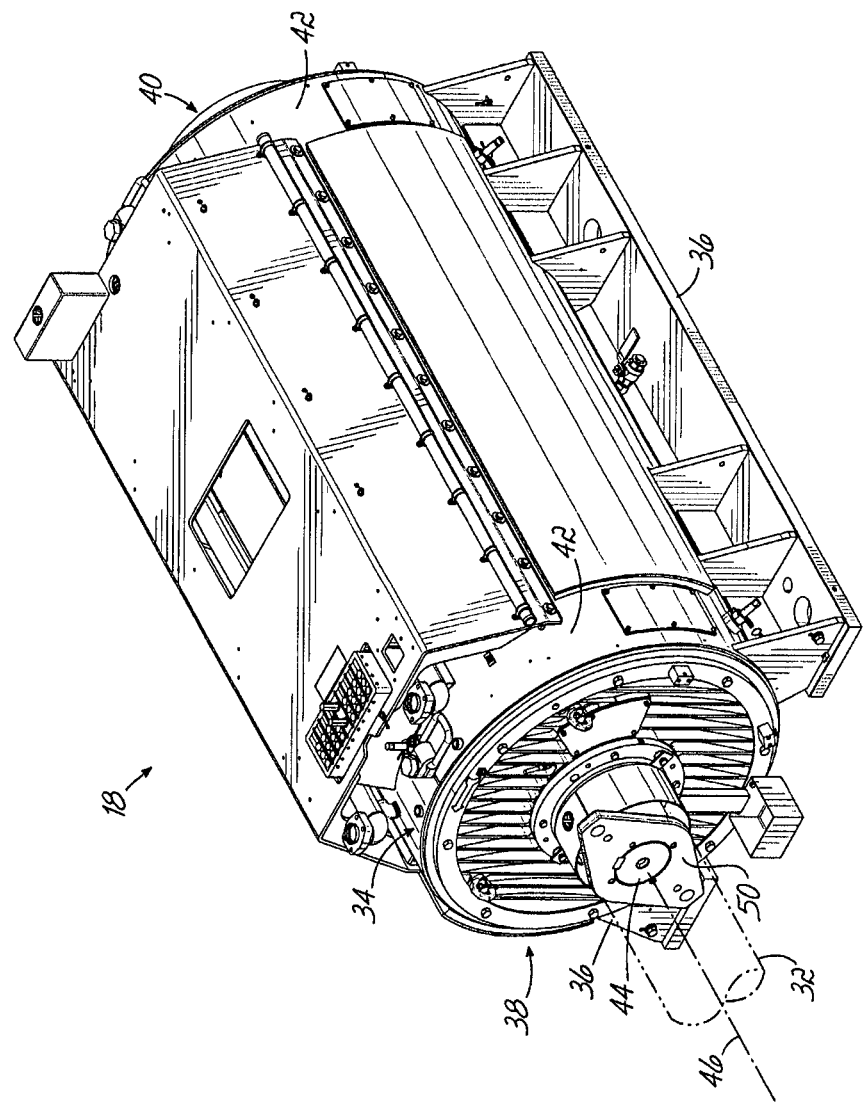
FIG. 2 is a perspective view of a generator in accordance with an embodiment of the invention.
Figure 3:
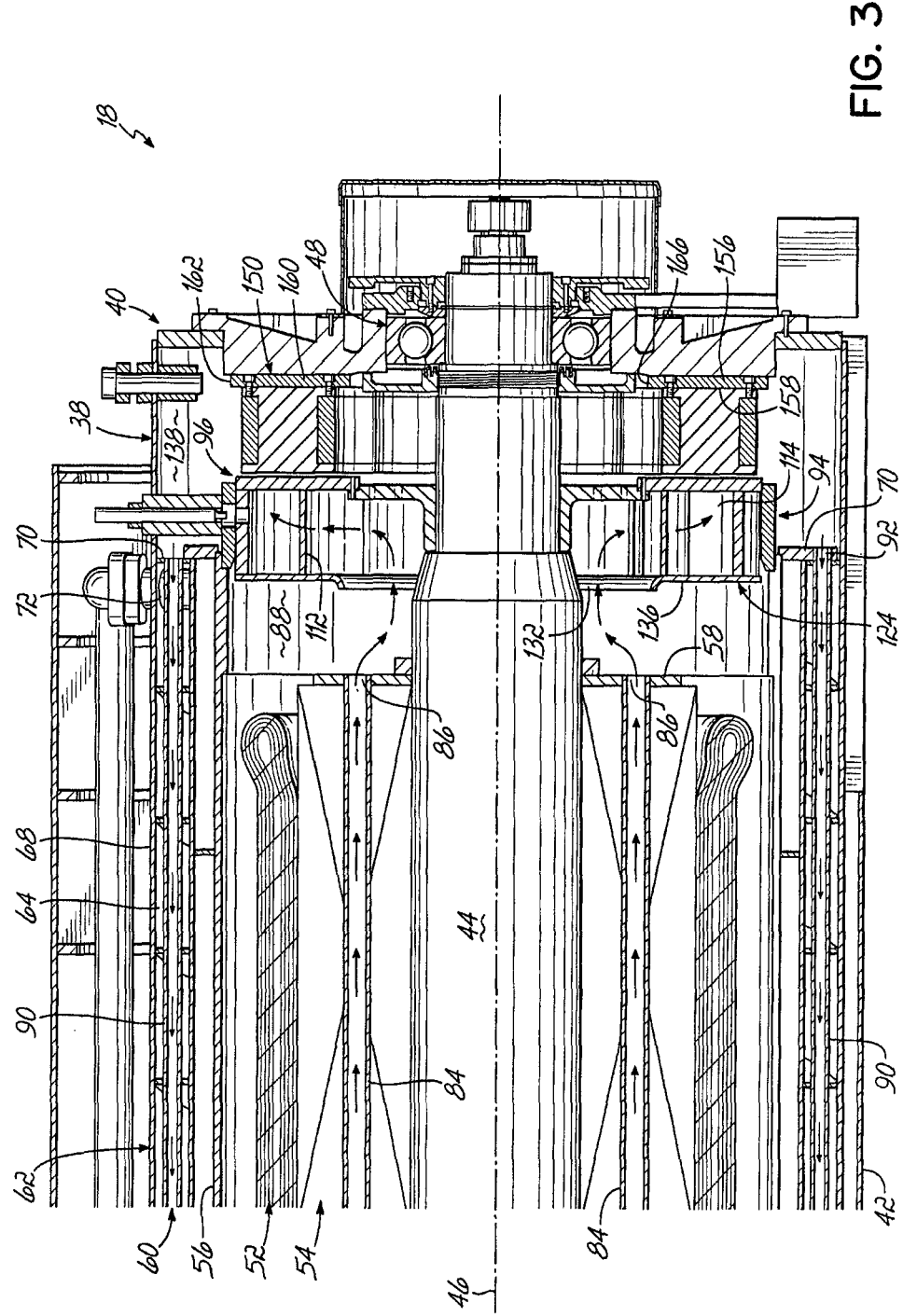
FIG. 3 is a partial cross-sectional view of the generator shown in FIG. 2.

In this regard, and in reference to FIG. 2, generator 18 includes an outer housing 34 configured to contain and shield the various internal components of the generator 18 and one or more supports 36 for supporting the generator 18 and for securing the generator 18 to the nacelle 14, such as to a floor or support frame of the nacelle 14. Because the generator 18 is a rotating machine, the outer housing 34 may be generally cylindrical in shape having a first front end 38, a second rear end 40, and a side wall 42 extending therebetween. The cylindrical configuration of the outer housing 34 is merely exemplary, however, and other shapes and configurations are possible for the outer housing 34. A generator drive shaft 44 may be disposed within the outer housing 34 and configured to be rotatable relative to the outer housing 34 about a central axis 46 defined thereby. In this regard, the drive shaft 44 may be rotatably supported relative to the outer housing 34 by one or more bearing assemblies 48 (FIG. 3). As such bearing assemblies are generally well known in the art, any further description thereof is not considered necessary. A portion of the generator drive shaft 44 may extend from the front end 38 of the outer housing 34 where it may be coupled to the secondary drive shaft 32 on the output side of the gear box 30 via a suitable mechanical coupling 50, as is generally known in the art. Accordingly, the generator drive shaft 44 rotates with the rotation of the secondary drive shaft 32, which is driven by rotor 16.

Figure 3A:
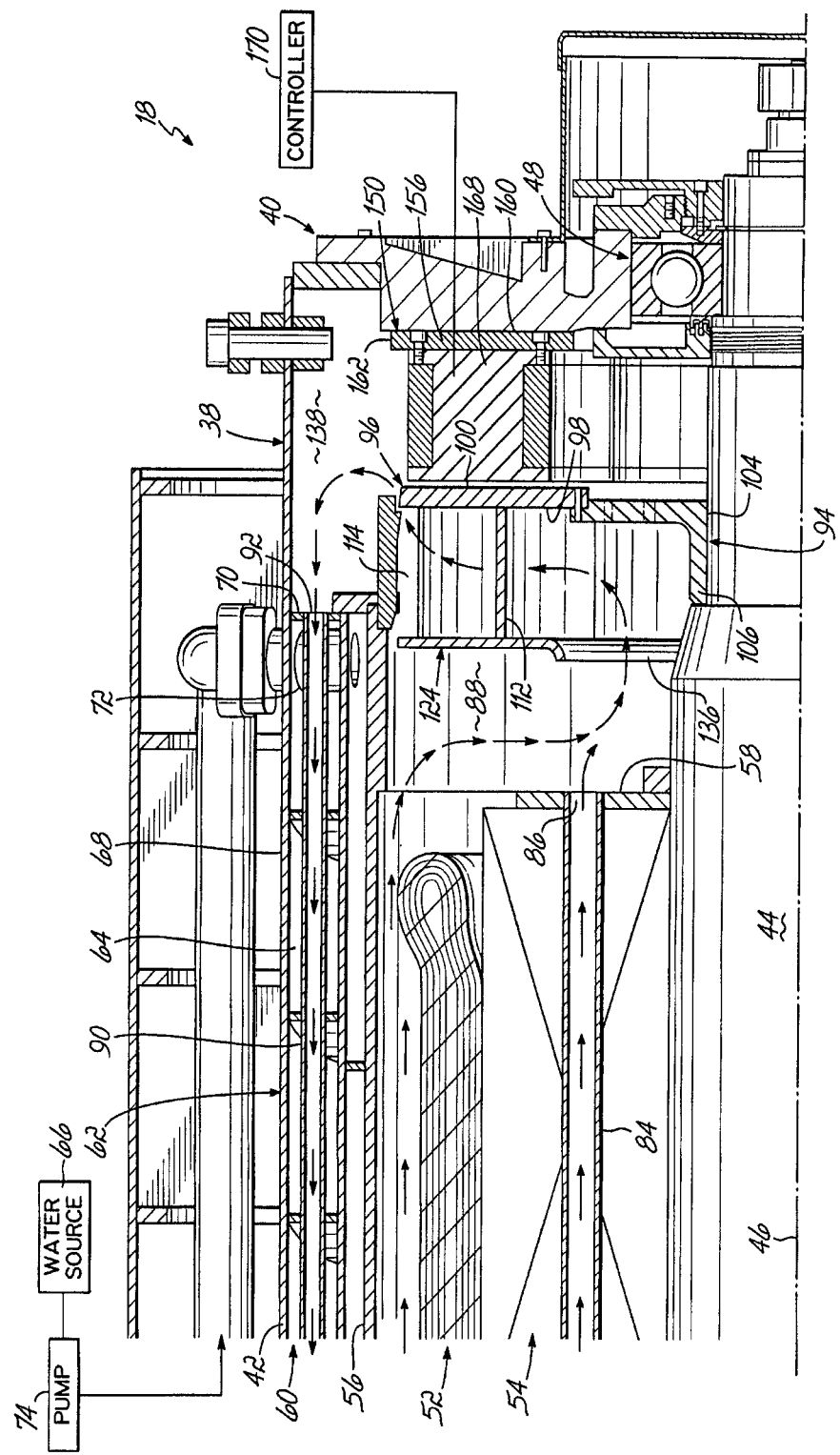
FIG. 3A is an enlarged view of the generator portion shown in FIG. 3.

The generator 18 includes a stator assembly 52 and a rotor assembly 54, both shown schematically in FIGS. 3 and 3A, concentrically disposed relative to each other within the outer housing 34. In an exemplary embodiment, the stator assembly 52 is generally fixed and stationary while the rotor assembly 54 is configured to rotate relative to the stator assembly 52. Thus, in the exemplary embodiment, the stator assembly 52 may be operatively coupled to the outer housing 34 or to a frame or support wall 56 of the outer housing 34, and the rotor assembly 54 may be operatively coupled to the generator drive shaft 44, wherein the stator assembly 52 is disposed radially outward of the rotor assembly 54. For example, the rotor assembly 54 may include a frame or support 58 which is coupled to the drive shaft 44 such that the rotor assembly 54 rotates with rotation of the drive shaft 44.

The stator assembly 52 generally includes a plurality of coils (shown schematically). As the coils, and in particular their construction and arrangement in the stator assembly 52 are generally known to those of ordinary skill in the art, no further discussion is deemed necessary in order to understand the various aspects of the invention. The rotor assembly 54 generally includes a plurality of magnetic elements for generating a magnetic field which induces a current in the coils carried by the stator assembly 52. In one embodiment, it is contemplated that permanent magnets may be carried by the rotor assembly 54. In another embodiment, however, it is contemplated that electromagnets may be carried by the rotor assembly 54. As the magnets, and in particular their construction and arrangement within the rotor assembly 54 are generally known to those of ordinary skill in the art, no further discussion is deemed necessary in order to understand the various aspects of the invention. In any event, the stator assembly 52 and rotor assembly 54 of the generator 18 cooperate to convert the mechanical energy received from the wind turbine rotor 16 into electrical energy so that the kinetic energy of the wind is harnessed for power generation. Specifically, the movement of the magnets of the rotor assembly 54 past the stationary coils of the stator assembly 54 induces an electrical current in the coils according to the precepts of Faraday's Law.

In the example above, the rotor assembly 54 is described as being the field source (i.e., exciting component) of the generator 18 and the stator assembly 52 is described as being the current source (i.e., armature winding). In alternative embodiments, however, the rotor assembly 54 may comprise the current source and the stator assembly 52 may comprise the field source. Moreover, those skilled in the art will appreciate generator arrangements where the stator assembly 52 is disposed radially inward of the rotor assembly 54 rather than vice-versa. Thus, aspects of the invention are not limited to that shown and described herein.

The generator 18 includes a heat exchanger 60 for removing heat produced by various components of the generator 18. In an exemplary embodiment, the heat exchanger 60 may include a water jacket 62 having walls defining a closed interior cavity 64 which is in fluid communication with a water source 66 for providing water to the jacket 62. For example, in one embodiment, the water jacket 62 may be generally positioned within the outer housing 34 such that walls of the jacket 62 may be formed by an outer housing wall 68 and the inner support wall 56 to which the stator assembly 52 may be coupled. The water jacket 62 further includes a rear end wall 70 extending between walls 68, 56 for closing off the interior cavity 64 at the rear of the generator 18. A front end wall (not shown) similarly extends between walls 68, 56 at the front of the generator for closing off the interior cavity 64 at that end. Thus, the interior cavity 64 of the water jacket 62 is fluidly isolated from the interior of the generator 18 such that water remains separated from the electrical components of the generator 18 (such as the coils and magnets of the stator and rotor assemblies 52, 54, respectively). While the term water jacket is used herein, it should be realized that the invention is not limited to the use of water as the coolant for the heat exchanger 60. In this regard, other fluid coolants may be used with jacket 62 to transport heat away from generator 18.

The water jacket 62 includes one or more inlets 72 in fluid communication with the water source 66, such that water may flow from the water source 66 into the interior cavity 64 of the water jacket 62 under pressure, for example, from a pump 74 operatively coupled to the water source 66. Water flowing through the interior cavity 64 picks up heat being generated by the generator 18, such as by the stator and rotor assemblies 52, 54, and transfers that heat away from the generator 18. In this regard, the water jacket 62 includes one or more outlets (not shown) in communication with a fluid reservoir for collecting the heated water. A second heat exchanger, such as a radiator or the like, may be provided and associated with the outlet or reservoir for removing the heat collected by the water flowing through water jacket 62. For example, the heat may be transferred to the surrounding environment. In any event, the cooled water from the second heat exchanger may then be re-circulated by directing the water back toward the inlet 72 of the jacket 62. Thus, the water (or other coolant) flowing through the jacket 62 represents a first fluid flow circuit 76 (FIG. 4) in which heat from the generator 18 is transferred to the water and subsequently rejected to the environment 78, for example.

Heat exchanger 60 is able to transfer heat away from the generator 18 by a conduction mode of heat transfer. For example, heat generated by the stator assembly 52 may be transferred through the walls of the jacket 62 and to the water flowing therethrough due to the proximity of the stator assembly 52 relative to the jacket 62. However, to increase the efficiency of the heat exchanger 60, as well as to facilitate heat removal from the rotor assembly 54, which is more remote from the water jacket 62, a second fluid flow circuit 80 may be established for transferring heat from the heat generating components 82 of the generator 18 and to the water in the first fluid flow circuit 76 via a forced convection mode of heat transfer. In this regard, the second fluid flow circuit 80 may include an air flow circuit established in the interior of the generator 18, wherein air is moved over or through the stator assembly 52 and/or the rotor assembly 54, and/or other heat generating components to pick up heat therefrom. The air may then be directed through the jacket 62 such that the heat in the air is transferred to the water flowing through the jacket 62, thereby cooling the generator 18.

To this end, and to establish the air flow circuit 80 in the generator 18, the rotor assembly 54 includes a plurality of passageways 84 generally extending along the longitudinal length of the rotor assembly 54. The number of passageways 84 and their size may vary depending on the specific application and those of ordinary skill in the art will recognize how to configure the passageways 84 to achieve sufficient heat transfer from the rotor assembly 54. In any event, each end 86 of the passageways 84 may be in fluid communication with an open, interior space 88 of the generator 18 within the outer housing 34 at the front and rear ends thereof (only rear shown in FIGS. 3 and 3A). In a similar manner, the heat exchanger 60, and more particularly the water jacket 62, may include a plurality of conduits 90 extending along the longitudinal length of the water jacket 62 and through the interior cavity 64 thereof. The number of conduits 90 and their size may vary depending on the specific application and those of ordinary skill in the art will recognize how to configure the conduits 90 to achieve sufficient heat transfer from the air and to the water. The conduits 90 are fluidly isolated from the water flowing in the interior cavity 64 of the jacket 62 so that there is no mixing of the water and air streams. The conduits 90 extend through the end walls 70 of the jacket 62 such that their ends 92 are open to the interior space 88 within the outer housing 34 at the front and rear ends thereof (again only rear shown in FIG. 3). The interior space 88 at the front and rear ends of the generator 18 and the passageways 84 and conduits 90 define the air flow circuit 80 within the generator 18.

Figure 4:
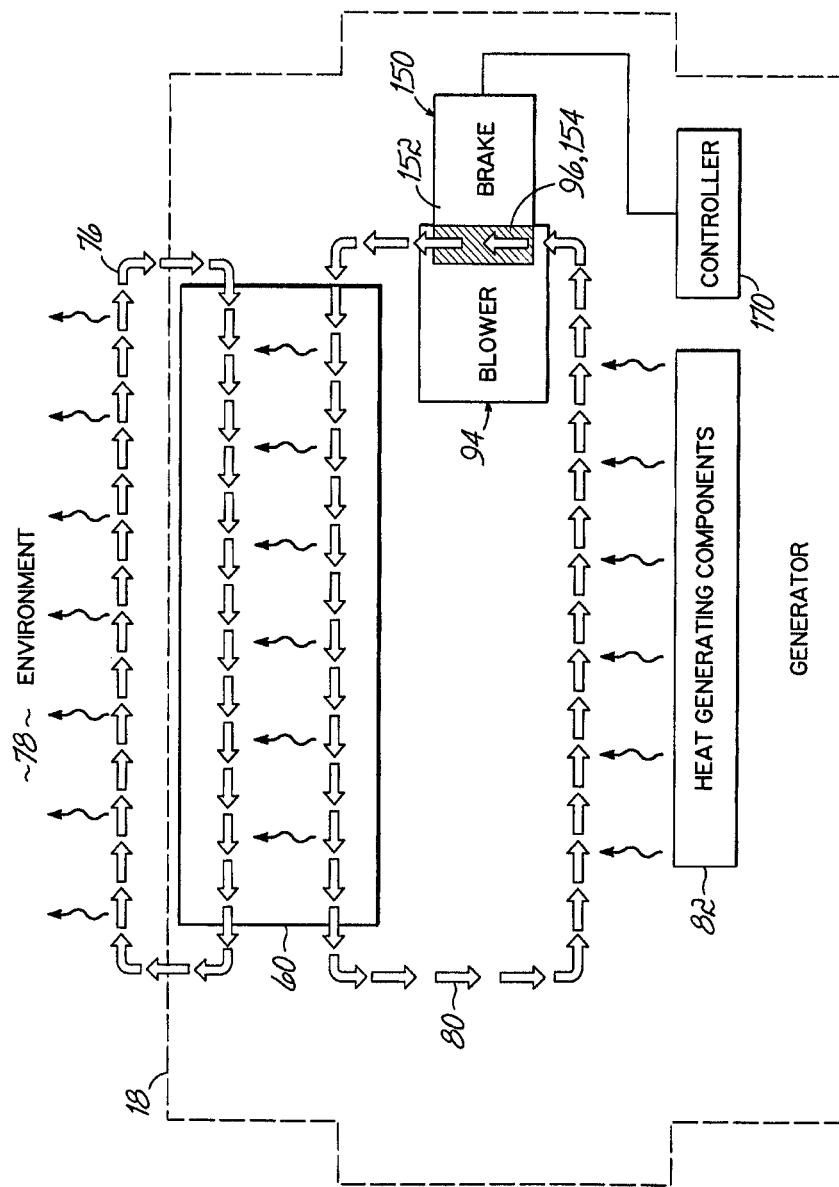
FIG. 4 is a schematic diagram of a wind turbine generator in accordance with an embodiment of the invention.

FIG. 4 is a schematic of the generator 18 and the heat exchanger 60 according to this embodiment. In this figure, the heat generating components 82 of the generator 18, such as the stator and rotor assemblies 52, 54, transfer their heat to the fluid in the second fluid flow circuit 80 (e.g., the air flow circuit). The heat in the second fluid flow circuit 80 is then transferred to the first fluid flow circuit 76 (e.g., the water flow circuit) in the heat exchanger 60. Heat may also be transferred to the first fluid flow circuit 76 directly from the heat generating components 82. The heat in the first fluid flow circuit 76 may then be transferred to the environment 78 or other suitable heat sink. As will be discussed below, the heat exchanger 60 or heat removal capabilities of the generator 18 may be an important aspect of incorporating the eddy current brake within the generator 18.

Figure 5:
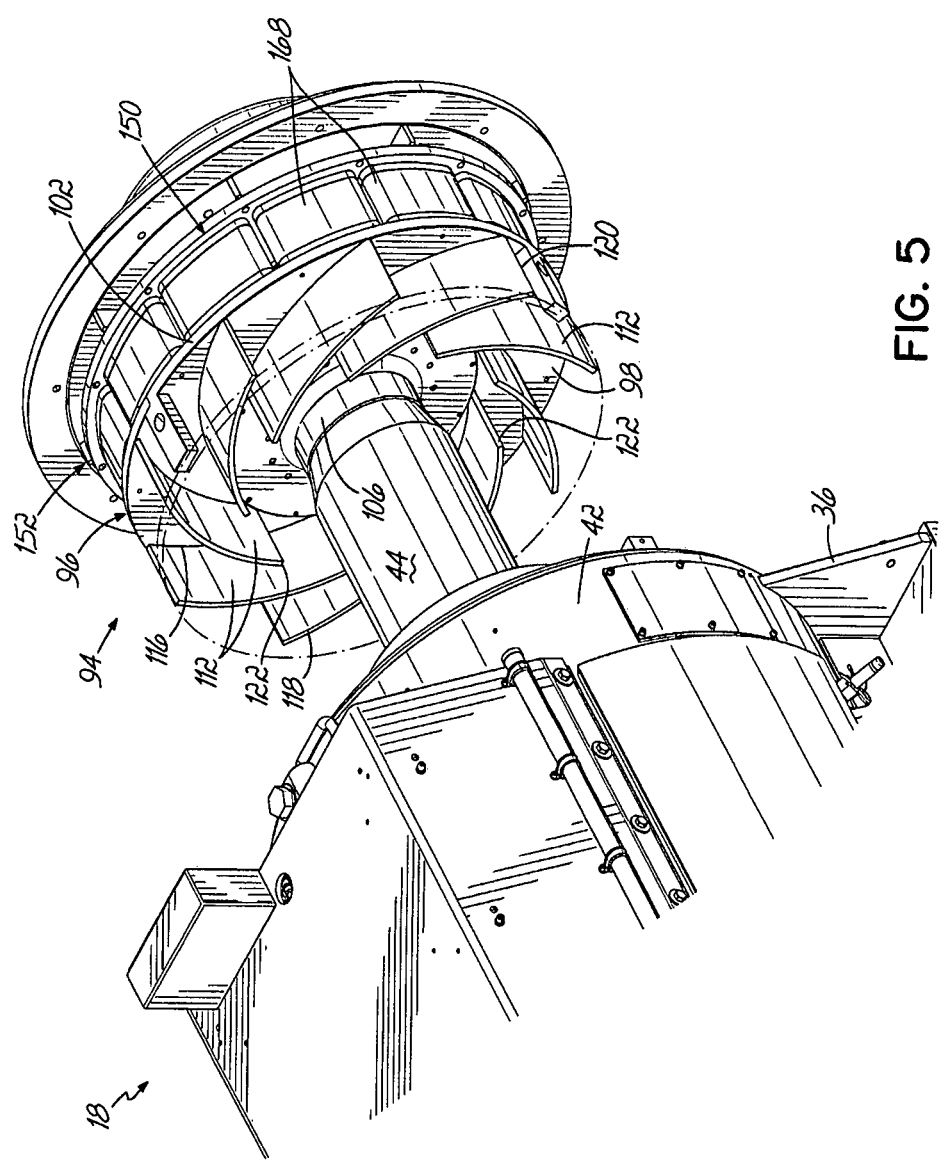
FIG. 5 is a partial perspective view of blower-brake assembly in accordance with an embodiment of the invention.

To create an air flow circuit 80 through the heat exchanger 60, as described above, the generator 18 includes a prime mover for causing the air to flow through the generator 18 and thereby establish air flow circuit 80. In accordance with an aspect of the invention, generator 18 includes a fan or blower 94 for generating a flow of air through the generator 18. In this regard and in reference to FIGS. 5 and 6, the blower 94 includes a generally circular, disc-shaped base plate 96 having a generally planar inner surface 98 and a generally planar outer surface 100 connected by an outer side wall 102. The base plate 96 may be configured as a generally solid plate member made from, for example, steel or other suitable metal or material. The base plate 96 includes a central aperture 104 configured to receive the generator drive shaft 44 therethrough when assembled (FIGS. 3 and 3A). In one embodiment, the base plate 96 may include a collar 106 having a flange integrally formed with or coupled to the base plate 96, and a tubular extension extending away from inner surface 98 toward the front end of the generator and defining the central aperture 104. The base plate 96 is configured to be fixedly secured to the drive shaft 44, such as at collar 106, such that the base plate 96 rotates with rotation of the drive shaft 44.

Figure 6:
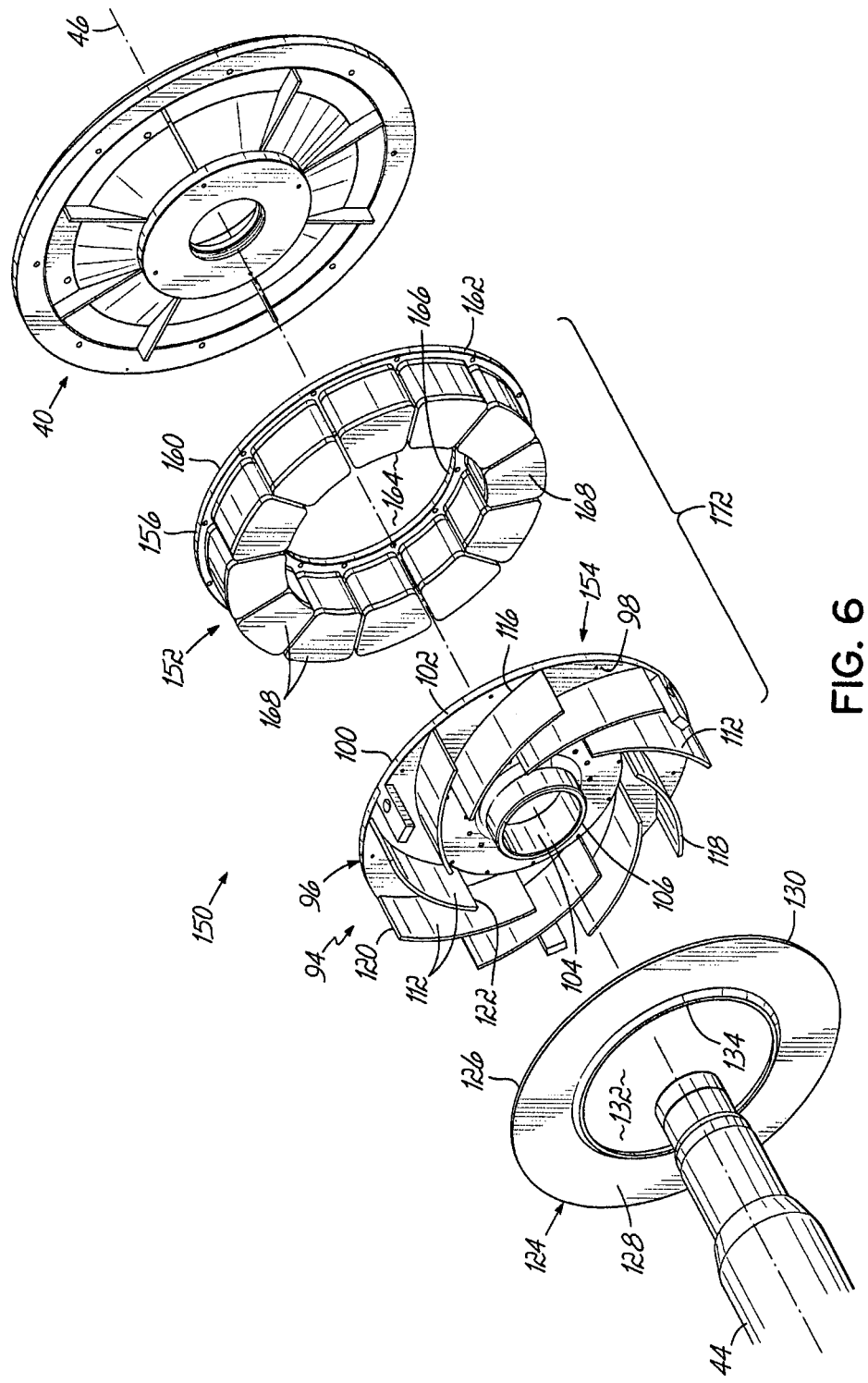
FIG. 6 is a disassembled view of the blower-brake assembly shown in FIG. 5.

The blower 94 further includes a plurality of blades or vanes 112 configured to increase the pressure of the air in the blower 94 and for directing the air flow toward a periphery 114 of the blower 94. In an exemplary embodiment, the vanes 112 may be configured as generally arcuately-shaped rectangular plates having a first side edge 116 fixedly secured to the inner surface 98 of the base plate 96, a second side edge 118, an outer end edge 120 of the vanes 112 positioned adjacent the side wall 102 of the base plate 96, and an inner end edge 122 positioned adjacent, but spaced from the central aperture 104. The vanes 112 may be made of steel or other suitable metal or material and coupled to base plate 96 by welding or other suitable process. Each of the inner end edges 122 of the vanes 112 may be positioned at a fixed radius from the central axis 46 and outboard of the collar 106. As illustrated in FIG. 6, the blower 94 may further include a generally circular, disc-shaped cover plate 124 having an outer surface 126, an inner surface 128, and an outer side wall 130 extending therebetween. The cover plate 124 may be configured as a generally solid plate member made from steel or other suitable metal or material. The outer surface 126 of the cover plate 124 may be coupled to the second side edge 118 of the vanes 112, such as by welding or suitable fasteners. The cover plate 124 also includes a central aperture 132 defining an inner side wall 134, which in an exemplary embodiment may be located at a terminating end of a lip directed away from the inner surface 128 and toward the front end 38 of the generator 18. The central aperture 132 may be generally larger than the central aperture 104 through the base plate 96 or defined by collar 106. In an exemplary embodiment, the inner side wall 134 of the cover plate 124 may be located so as to be adjacent the inner end edge 122 of the vanes 112 (FIGS. 3 and 3A). As illustrated in FIG. 3 and discussed in more detail below, the central aperture 132 in the cover plate 124 operates as an opening 136 between the generator drive shaft 44 and the inner side wall 134 for drawing air from the generator interior space 88 into the blower 94.

In operation, and as best illustrated in FIGS. 3 and 3A, rotation of the generator drive shaft 44, such as, for example, from secondary drive shaft 32 (and rotor 16), causes the blower 94, and more specifically, the base plate 96, vanes 112, and cover plate 124 to rotate about the central axis 46. This rotation causes air in the interior space 88 of the generator 18, such as at its rear end as shown in FIGS. 3 and 3A, to be pulled into the blower 94 through the opening 136. The air traverses the interstitial spaces between adjacent vanes 112 and is ejected from the blower 94 along its periphery 114. The high pressure air is ejected into a head space 138 in fluid communication with the ends 92 of the conduits 90 which extend through the water jacket 62. As described above in reference to FIG. 4, the heat in the air is transferred to the water flowing through the water jacket 62. The now cooled air, which is still under pressure from the blower 94, is directed out of the ends 92 of the conduits 90 at the front end of the generator 18 into an interior space 88 in fluid communication with the ends 86 of the passageways 84 extending through the rotor assembly 54. Residual spaces in the generator 18, such as through the stator assembly 52, may also provide additional air flow passageways through or across the heat generating components 82. As the air traverses these passageways, heat is transferred from the heat generating components 82 to the air. The now heated air exits the ends 86 of the passageways 84 at the rear end of the generator 18 and is again pulled into the blower 94 to complete and repeat the air flow circuit 80.

As mentioned above, and in a further aspect of the invention, an eddy current brake is incorporated into the generator 18. More particularly, the eddy current brake may be positioned within the outer housing 34 of the generator 18. Even more specifically, in an exemplary embodiment, the eddy current brake may be integrated with the blower 94 used to generate the air flow circuit 80 within the generator 18, as described above. The structure and operating principles of eddy current brakes are generally well understood and broadly include a rotating metal disc or member located within a magnetic field generated, for example, by magnets in proximity to the rotating member. The passing of the metal member through the magnetic field creates eddy currents in the member. The eddy currents, in turn, generate an opposing magnetic field in accordance to Lenz's law which opposes the rotation of the member. This opposing force effectively operates as a braking force for slowing the rotation of the member. The net result is that the motion of the rotating member is converted into heat in the rotating member. Thus, the rotating member may become extremely hot depending on, for example, the amount of braking required. The magnets that generate the magnetic field may be permanent magnets, but preferably include electromagnets. The use of electromagnets allows the current to the coils of the electromagnets to be controlled, which in turn allows the strength of the magnetic field to be controlled. The strength of the eddy currents created within the rotating member is related to the strength of the magnetic field such that by controlling the current to the electromagnets, the braking force on the rotating member may be controlled.

FIGS. 3 and 3A, 5 and 6 illustrate an exemplary embodiment of an eddy current brake, generally shown at 150, incorporated within the generator 18. The eddy current brake 150 includes a magnet assembly 152 and a rotating member 154 in proximity to the magnet assembly 152. The magnet assembly 152 includes a generally circular, disc-shaped backer plate 156 having a generally planar inner surface 158 and a generally planar outer surface 160 connected by an outer side wall 162 (FIG. 3). The backer plate 156 may be configured as a generally solid plate member made from, for example, steel or other suitable metal or material. The backer plate 156 includes a central aperture 164 defining an inner side wall 166. The backer plate 156 may be configured to be coupled to the stationary portions of the generator 18 such that it does not rotate with rotation of the drive shaft 44.

A plurality of electromagnetic modules 168 may be coupled to the inner surface 158 of the backer plate 156 and circumferentially spaced thereabout as shown in FIG. 6 such that substantially the entire circumference of the backer plate 156 (e.g., adjacent the outer side wall 162) includes an electromagnet module 168. The electromagnetic modules 168 may be configured as DC electromagnets. As the construction and arrangement of the electromagnetic modules 168 are generally known to those of ordinary skill in the art, no further discussion is deemed necessary in order to understand the various aspects of the invention. In any event, the electromagnetic modules 168 may be operatively coupled to a controller, schematically shown at 170, for controlling the current supplied to the modules 168, thus controlling the braking force on the generator drive shaft 44 as explained above (FIG. 3A).

As illustrated in FIGS. 3 and 3A, the magnet assembly 152 may be placed in close proximity to the blower 94. More particularly, the magnet assembly 152 may be located such that the electromagnetic modules 168 are adjacent and generally confront the outer surface 100 of the base plate 96 of the blower 94, such as being separated by a small air gap. In this way, and in one aspect of the invention, the base plate 96 of the blower 94 may be used as the rotating member 154 of the eddy current brake 150. Thus, in this embodiment, the blower 94 and the eddy current brake 150 are combined in a manner to provide an integrated blower-brake assembly 172. In this context, integrated means that at least one component of the blower 94 is used as a component of the eddy current brake 150. As noted above, in this embodiment, the base plate 96 of the blower 94 is used as the rotating disc or rotating member 154 of the eddy current brake 150. Thus, a more efficient use of existing components is achieved.

In use, during normal operations of the wind turbine 10, no current is supplied to the electromagnetic modules 168, as dictated, for example, by controller 170. Consequently, the electromagnetic modules 168 do not generate an electric field and thus no braking force is applied to the base plate 96 of the blower 94 (operating as the rotating member 154 of the eddy current brake 150). However, when it is desired to reduce the rotational speed of the rotor 16 of the generator 18, such as during high speed conditions, a grid fault, or at other over-speed conditions, the controller 170 may be configured to supply a current to the electromagnetic modules 168. As noted above, this causes a braking force to be applied to the base plate 96 of blower 94, and consequently to the drive shaft 44 and ultimately to the rotor 16 through the wind turbine drive train. Accordingly, the rotor 16 and generator drive shaft 44 are reduced in speed as a result of the braking. The amount of braking, and thus the amount of current supplied to the electromagnetic modules 168, may vary depending on the specific application and other factors. Those of ordinary skill in the art will recognize the amount of current to supply to the electromagnetic modules 168 to achieve the desired braking in the wind turbine 10.

As noted above, the braking operation causes the rotating member 154, which in this case is the base plate 96 of the blower 94, to heat up. In another aspect of the invention, integration of the blower 94 and the eddy current brake 150 may provide certain benefits. In this regard, the base plate 96 is part of the air flow circuit 80 established within the generator 18. Thus, the moving air caused by the blower 94 flows over the heated base plate 96 (e.g., as it traverses the interstitial space between the vanes 112) and heat is transferred from the base plate 96 to the air. This provides a cooling effect to the base plate 96. Of course, the heat transferred to the air from the base plate 96 may be transferred to the water flowing through the water jacket 62 as described above. Thus, by integrating the eddy current brake 150 with the blower 94, the heat exchanger 60 of the generator 18 may be used to extract heat therefrom. FIG. 4 schematically illustrates this exemplary embodiment. In this regard, the overlap in the blower 94 and eddy current brake 150 (depicted by cross hatching) illustrates that the base plate 96/rotating member 154 is shared between the two components. FIG. 4 also illustrates that the shared component (base plate 96 of the blower 94/rotating member 154 of eddy current brake 150) is incorporated within the air flow circuit 80 established within the generator 18 so that the shared component is cooled by the air flow.

The ability to cool the rotating member 154 of the eddy current brake 150 (e.g., the base plate 96) may provide certain advantages. For example, the amount of rotor or generator braking may be limited by the amount of heating permitted within the rotating member 154. For example, the temperature of the rotating member 154 may not exceed a maximum temperature due to, for example, certain material or structural requirements. If the rotating member 154 is actively cooled, then the amount of braking provided by the eddy current brake may be significantly increased. Thus, more aggressive braking may be applied. Additionally, in conventional eddy current brakes, the rotating member is typically cooled by free convection, which in many cases is significantly less efficient than forced convection. Thus, it may take a relatively long time for the rotating member to cool after being heated by a braking operation. This may become problematic in situations where braking frequency may be high or the maximum temperature of the rotating member is reached. In the instant invention, using forced convention to cool the rotating member allows the rotating member to be cooled more quickly, thus making braking using the eddy current brake more readily available, even in high frequency situations.

Figure 7:
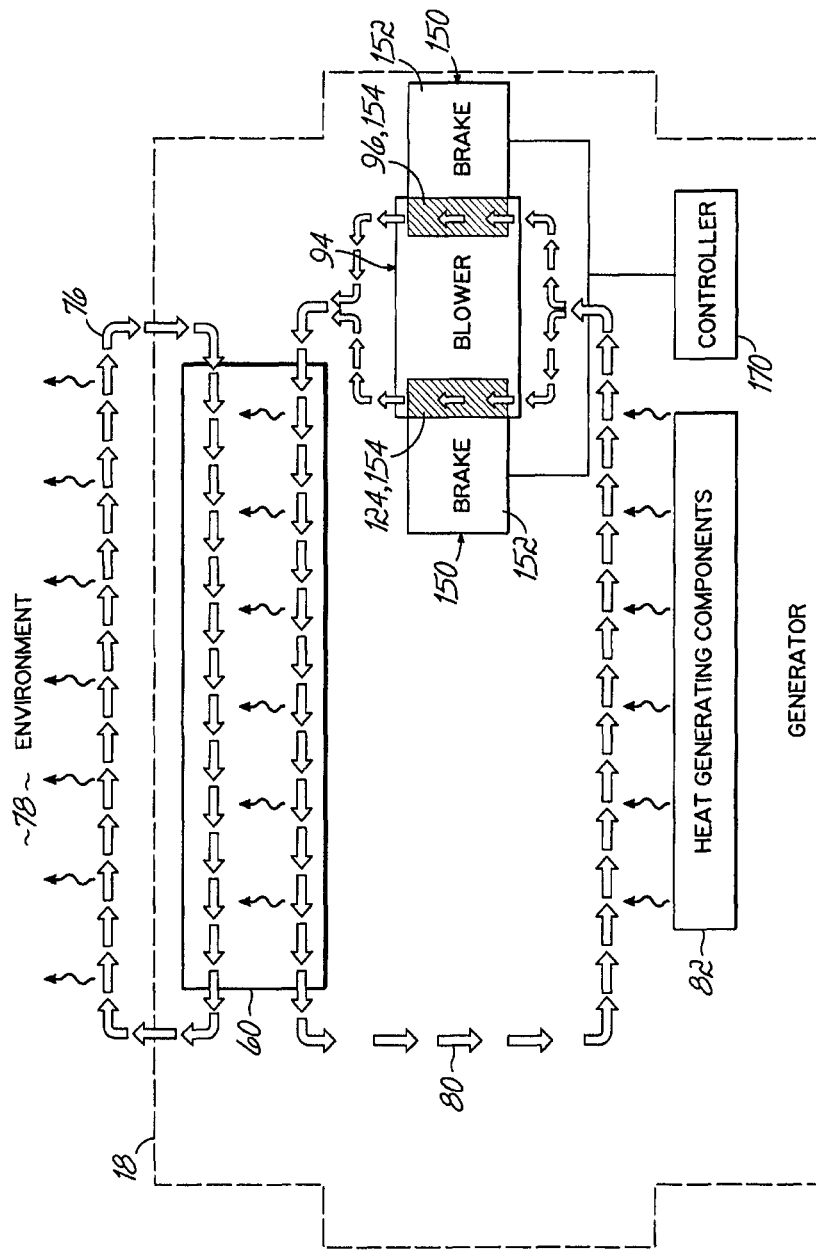
FIG. 7 is a schematic diagram of a wind turbine generator in accordance with another embodiment of the invention.

While the above describes an exemplary embodiment of the invention, there are a number of alternative embodiments that remain within the scope of the present invention. As described above, the integrated blower-brake assembly 172 includes a single rotating member 154 and a single magnet assembly 152. However, additional rotating member/magnet assembly pairings may be included within the generator 18. By way of example and as illustrated in FIG. 7, the cover plate 124 of the blower 94 may operate as a rotating member 154 for a second eddy current brake on the inner side of the blower 94. In this regard, a second magnet assembly may be positioned in close proximity to the cover plate 124 such that the electromagnetic modules carried thereby are adjacent and generally confront the inner surface 128 of the cover plate 124 of the blower 94. The electromagnetic modules on the second magnet assembly may be coupled to the controller 170 so as to control the braking provided by this additional eddy current brake.

Similar to the above, a braking operation will cause the cover plate 124 to heat up. However, similar to the base plate 96, the cover plate 124 is part of the air flow circuit 80 established within the generator 18. Thus, the moving air caused by the blower 94 flows over the heated cover plate 124 (e.g., as it traverses the interstitial space between the vanes 112) and heat is transferred from the cover plate 124 to the air. This provides a cooling effect to the cover plate 124 and the heat transferred to the air from the cover plate 124 is transferred to the water flowing through the water jacket 62 as described above. Those of ordinary skill in the art will recognize how to size the blower 94 such that a sufficient amount of cooling is provided in order to provide the desired amount of braking to be performed by the eddy current brake(s) 150.

Figure 8:
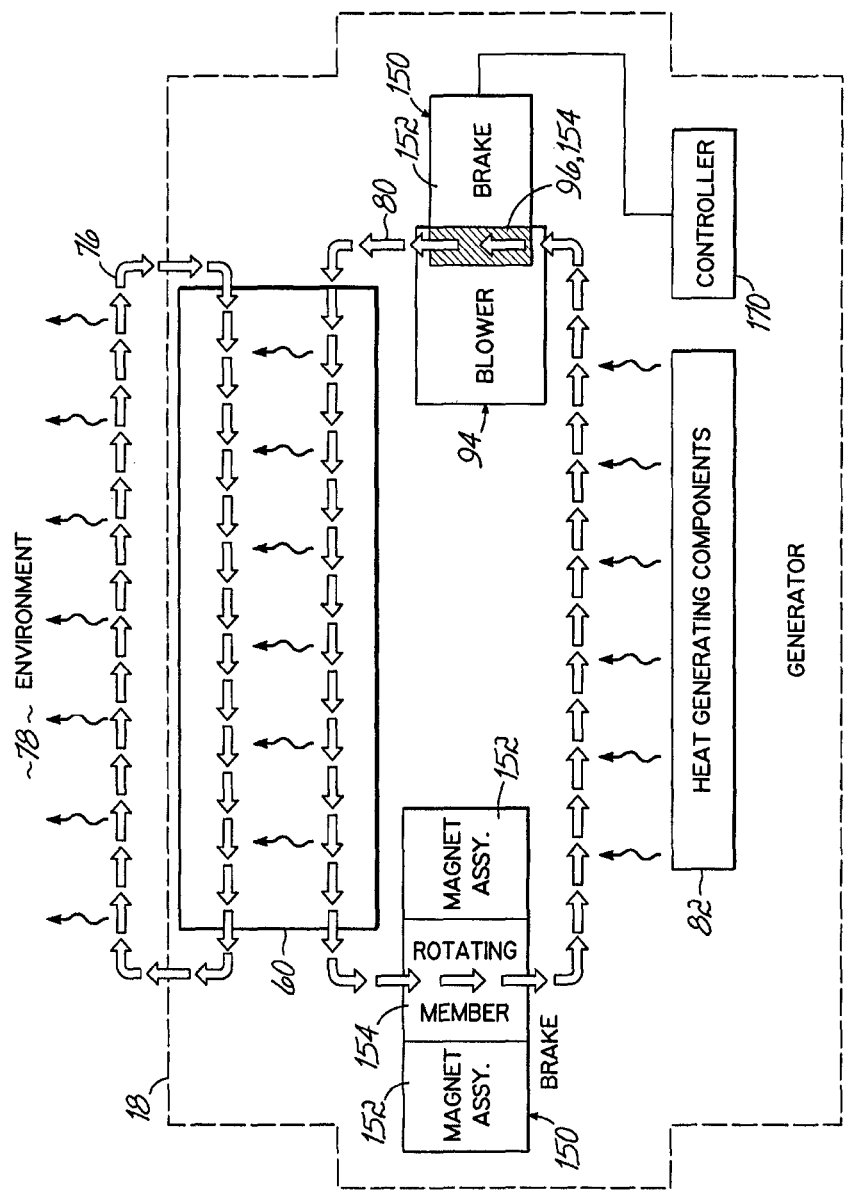
FIG. 8 is a schematic diagram of a wind turbine generator in accordance with another embodiment of the invention.
Figure 9:
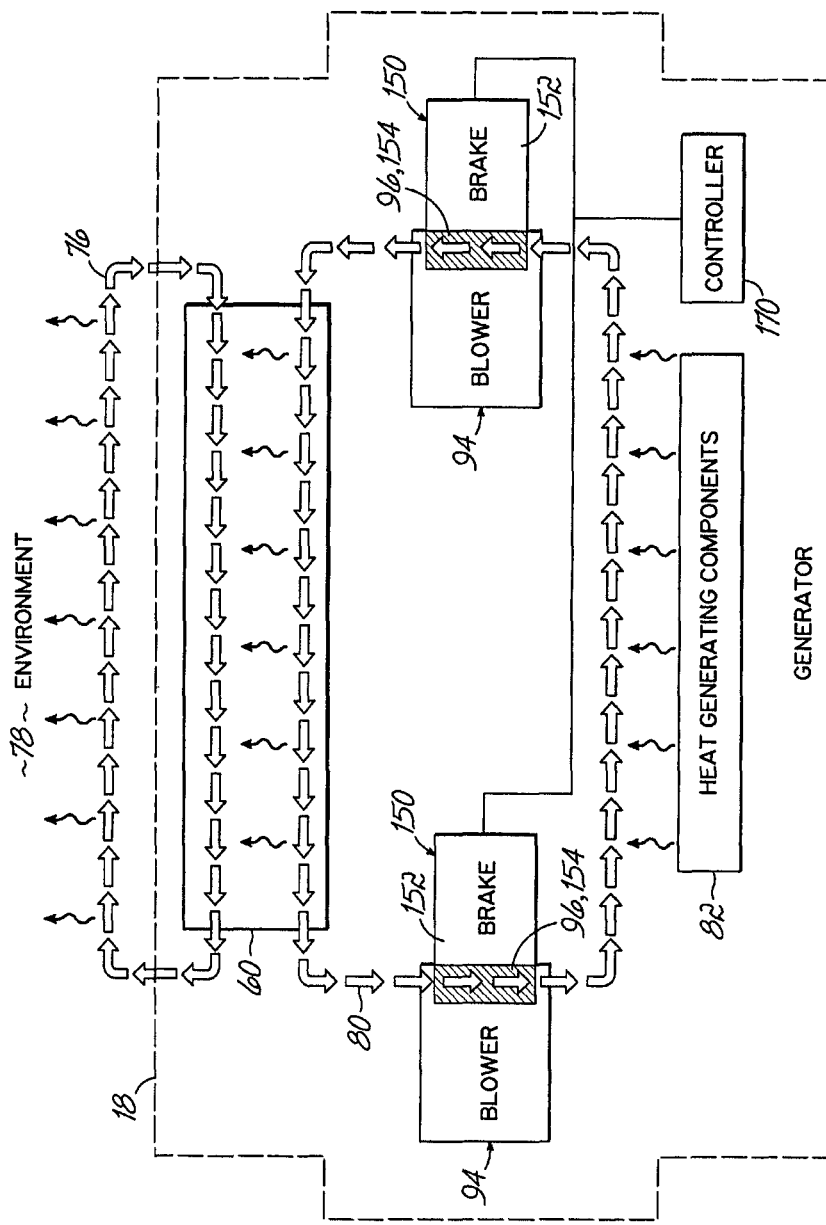
FIG. 9 is a schematic diagram of a wind turbine generator in accordance with another embodiment of the invention.

In addition to a single or double eddy current brake 150 at the rear end of the generator 18, in another alternative embodiment, one or more eddy current brakes 150 may be provided at the front end of the generator 18. Since a blower is provided in the rear end of the generator 18, i.e., blower 94, the eddy current brake at the front end of the generator 18 may or may not be integrated within a blower. In those cases in which a blower is not provided, a rotating member 154 similar to the base plate 96 may be provided (i.e., without the vanes 112 and cover plate 124). A magnet assembly may be provided on one side of the rotating member (single eddy current brake) or on both sides of the rotating member (double eddy current brake). Additional rotating member/magnet assembly pairings may also be provided. When there is no blower at the front end of the generator 18, the eddy current brakes at that end of the generator 18 should be positioned such that air flowing along the air flow circuit 80 flows over the rotating member (s). Of course a blower may also be provided at the front end of the generator 18 having a single or multiple rotating member/magnet assembly pairings. These embodiments are schematically illustrated in FIGS. 8 and 9. In still a further alternative, the blower-brake assembly 172 and its alternatives may be provided only at the front end of the generator 18 (not shown).

Figure 10:
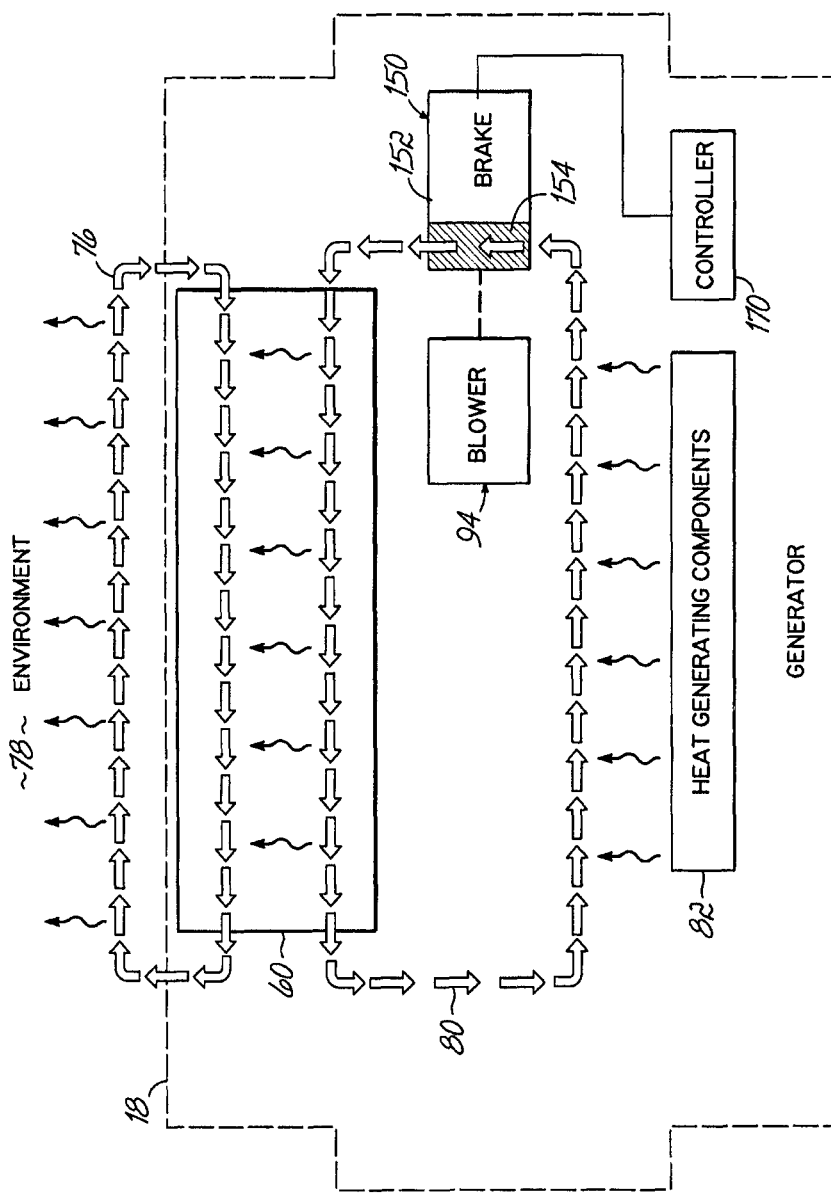
FIG. 10 is a schematic diagram of a wind turbine generator in accordance with another embodiment of the invention.

In yet a further alternative embodiment, the blower 94 and the eddy current brake 150 may not be integrated (e.g., such that they no longer share a common component) but have a specific arrangement that may still provide certain benefits for locating the eddy current brake within the generator 18, and more specifically within the outer housing 34 thereof. In this regard, a benefit may still be gained if the eddy current brake 150 is positioned within the air flow circuit 80 established by blower 94 within the generator 18. Certainly making the base plate 96 (and/or cover plate 124) of the blower 94 operate as the rotating member 154 of the eddy current brake 150 allows the forced air to flow over the heated rotating member to achieve cooling. The invention, however, is not so limited. Instead of sharing the base plate 96 of the blower 94, the eddy current brake 150 may include its own rotating member 154, formed by a plate member similar to the base plate 96 but not having the other structure of the blower attached thereto. The eddy current brake 150 may then be positioned relative to the blower 94 within the generator 18 such that the air flow generated by the blower 94 flows over the separate rotating member 154. Thus, the invention is not limited to an integrated blower-brake assembly 172. Instead, aspects of the invention may encompass an embodiment where the blower 94 and eddy current brake 150 are separate, but the eddy current brake 150 is located within the air flow circuit 80 established by the blower 94 such that active cooling, e.g., that provided by forced connection, is achieved. Similar to above, one or more rotating member/magnet assembly pairings may be provided. This alternative embodiment is schematically illustrated in FIG. 10, for example.

While the present invention has been illustrated by a description of various preferred embodiments and while these embodiments have been described in some detail, it is not the intention of the inventor to restrict or in any way limit the scope of the appended claims to such detail. Additional advantages and modifications will readily appear to those skilled in the art. For example, the heat exchanger 60 is described above as comprising the water jacket 62 within the outer housing 34 of the generator 18. In alternative embodiments, however, the heat exchanger 60 may be positioned outside of the outer housing 34. Such arrangements are common in convention doubly-fed induction generators, for example. The heat exchanger may be either an air-to-air or air-to-liquid heat exchanger. In addition to appreciating modifications like these, skilled persons will appreciate how the various features of the invention may be used alone or in any combination depending on the needs and preferences of the user.

What is claimed is:

1. A wind turbine generator, comprising:
   an outer housing adapted to be positioned within the nacelle;
   a drive shaft rotatably mounted within the outer housing;
   a stator assembly positioned within the outer housing;
   a rotor assembly positioned within the outer housing, wherein the stator assembly is coupled to the outer housing so as to be stationary and the rotor assembly is operatively coupled to the drive shaft so as to be rotated with rotation of the drive shaft;
   a heat exchanger for removing heat from the generator;
   a blower positioned within the outer housing, the blower generating a first fluid flow circuit within the generator configured to transport heat from at least one of the stator and rotor assemblies to the heat exchanger, the blower including a first rotating plate; and
   a first eddy current brake positioned within the outer housing, the first eddy current brake including a first rotating member,
   wherein the first rotating member of the first eddy current brake is positioned in the first fluid flow circuit established by the blower such that fluid moving in the first fluid flow circuit passes over the first rotating member so as to cool the first rotating member.

2. The wind turbine generator according to claim 1, wherein the first eddy current brake is integrated with the blower.

3. The wind turbine generator according to claim 2, wherein the first rotating plate of the blower operates as the first rotating member of the first eddy current brake.

4. The wind turbine generator according to claim 1, wherein the first eddy current brake further includes a first magnet assembly including a plurality of electromagnetic modules positioned in close proximity to the first rotating member, the generator further including a controller for controlling the current to the electromagnetic modules so as to control the braking provided by the first eddy current brake.

5. The wind turbine generator according to claim 1, comprising a second eddy current brake positioned within the outer housing, the second eddy current brake including a second rotating member, wherein the second rotating member of the second eddy current brake is positioned in the first fluid flow circuit established by the blower such that fluid moving in the first fluid flow circuit passes over the second rotating member so as to cool the second rotating member.

6. The wind turbine generator according to claim 5, wherein the second eddy current brake is integrated with a blower.

7. The wind turbine generator according to claim 5, wherein the first eddy current brake is integrated with the blower and, wherein the second eddy current brake is integrated with the same blower that is integrated with the first eddy current brake.

8. The wind turbine generator according to claim 7, wherein the blower includes a second rotating plate, the second rotating plate of the blower operating as the second rotating member of the second eddy current brake.

9. The wind turbine generator according to claim 5, wherein the second eddy current brake further includes a second magnet assembly including a plurality of electromagnetic modules positioned in close proximity to the second rotating member, the generator further including a controller for controlling the current to the electromagnetic modules so as to control the braking provided by the second eddy current brake.

10. The wind turbine generator according to claim 1, further comprising a second fluid flow circuit, the second fluid flow circuit flowing through the heat exchanger and configured to remove heat from the first fluid flow circuit and transfer the heat away from the generator.

11. The wind turbine generator according to claim 10, wherein the heat exchanger includes a plurality of conduits extending therethrough configured to carry the fluid from the first fluid flow circuit and maintain the fluid of the first fluid flow circuit isolated from the fluid of the second fluid flow circuit.

12. The wind turbine generator according to claim 10, wherein the rotor assembly includes a plurality of passageways extending along a length thereof configured to carry the fluid from the first fluid flow circuit.

13. The wind turbine generator according to claim 1, wherein the heat exchanger is configured as a water jacket.

14. A wind turbine, comprising:
a tower;
a nacelle disposed adjacent a top of the tower;
a rotor including a hub and at least one wind turbine blade extending from the hub; and
a generator disposed in the nacelle, comprising:
an outer housing;
a drive shaft rotatably mounted within the outer housing;
a stator assembly positioned within the outer housing;
a rotor assembly positioned within the outer housing, wherein the stator assembly is coupled to the outer housing so as to be stationary and the rotor assembly is operatively coupled to the drive shaft so as to be rotated with rotation of the drive shaft;
a heat exchanger for removing heat from the generator;
a blower positioned within the outer housing, the blower generating a first fluid flow circuit within the generator configured to transport heat from at least one of the stator and rotor assemblies to the heat exchanger, the blower including a first rotating plate; and
a first eddy current brake positioned within the outer housing, the first eddy current brake including a first rotating member,
wherein the first rotating member of the first eddy current brake is positioned in the first fluid flow circuit established by the blower such that fluid moving in the first fluid flow circuit passes over the first rotating member so as to cool the first rotating member.

15. A method of operating a wind turbine generator having an outer housing, a drive shaft rotatably mounted within the outer housing, a stator assembly positioned within the outer housing, a rotor assembly positioned within the outer housing, and a heat exchanger, comprising:
driving the drive shaft of the generator using a rotor of a wind turbine;
rotating the rotor assembly relative to the stator assembly to generate electricity;
establishing within the outer housing a first fluid flow circuit configured to transport heat to the heat exchanger, the first fluid flow circuit being established by a blower having a first rotating plate;
positioning a first eddy current brake within the outer housing such that a first rotating member of the first eddy current brake is positioned in the first fluid flow circuit;
using the first eddy current brake to apply a braking force; and
cooling the first rotating member by passing fluid moving in the first fluid flow circuit over the first rotating member.

16. The method according to claim 15, further comprising integrating the first eddy current brake into the blower.

17. The method according to claim 16, further comprising using the first rotating plate of the blower as the rotating member of the first eddy current brake.

18. The method according to claim 15, further comprising:
providing a second eddy current brake positioned within the outer housing having a second rotating member; and
positioning the second rotating member in the first fluid flow circuit; and
cooling the second rotating member by passing fluid moving in the first fluid flow circuit over the second rotating member.

19. The method according to claim 18, further comprising integrating the second eddy current brake into a blower.

20. The method according to claim 15, further comprising using a second fluid flow circuit to remove heat from the first fluid flow circuit and away from the generator.

21. The method according to claim 14, wherein the nacelle includes a nacelle housing, and the generator is disposed in the nacelle housing.

* * * * *